(12) United States Patent
Taylor

(10) Patent No.: US 7,801,559 B2
(45) Date of Patent: Sep. 21, 2010

(54) METHODS AND APPARATUS FOR BASEBAND DIGITAL SPECTRUM TRANSLATION (BDST)

(75) Inventor: Richard Duane Taylor, Moneta, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 838 days.

(21) Appl. No.: 11/708,960

(22) Filed: Feb. 20, 2007

(65) Prior Publication Data
US 2008/0200136 A1    Aug. 21, 2008

(51) Int. Cl.
*H04M 1/00* (2006.01)

(52) U.S. Cl. .............. 455/553.1; 455/90.1; 455/552.1; 455/563; 455/110; 455/106; 455/93; 455/114.3; 710/5; 710/32; 710/35; 341/144; 380/227

(58) Field of Classification Search ........... 455/553.1, 455/90.1, 552.1, 563, 110, 93, 106, 114.3; 710/5, 1, 32, 35; 341/144; 380/227
See application file for complete search history.

(56) References Cited

U.S. PATENT DOCUMENTS

| | | | |
|---|---|---|---|
| 4,404,685 A * | 9/1983 | Rogers | 455/76 |
| 5,060,295 A * | 10/1991 | Borras et al. | 455/186.1 |
| 5,491,727 A * | 2/1996 | Petit | 375/358 |
| 5,592,556 A * | 1/1997 | Schwed | 380/274 |
| 5,926,514 A * | 7/1999 | Meador et al. | 375/346 |
| 6,259,253 B1 * | 7/2001 | Ellingson | 324/322 |
| 6,323,795 B1 * | 11/2001 | Yang et al. | 341/143 |
| 7,072,622 B2 * | 7/2006 | Hsu et al. | 455/90.2 |
| 7,515,935 B2 * | 4/2009 | Ibrahim et al. | 455/553.1 |
| 2007/0232239 A1 * | 10/2007 | Der et al. | 455/73 |
| 2008/0049817 A1 * | 2/2008 | Der et al. | 375/219 |
| 2008/0096484 A1 * | 4/2008 | Tuttle et al. | 455/41.2 |

* cited by examiner

*Primary Examiner*—Marceau Milord
(74) *Attorney, Agent, or Firm*—Allen, Dyer, Doppelt, Milbrath & Gilchrist, P.A.

(57) ABSTRACT

A method for transmitting and receiving digitally modulated wireless signals using an analog FM transceiver is provided. The analog FM transceiver has a transmit speech audio frequency band, a receive speech audio frequency band substantially equal to the transmit speech audio frequency band, a subaudible frequency band, a direct microphone audio input, and a direct speaker audio output. The method includes generating, in a baseband digital spectrum translator external to the analog FM transceiver, a baseband transmit signal occupying frequencies substantially within the transmit speech audio frequency band of the analog FM transceiver. The method also includes applying the generated baseband transmit signal to the direct microphone audio input to thereby transmit a digitally encoded RF TX signal having a constant envelope and using the analog FM transceiver to receive a digitally encoded RF RX signal with a constant envelope and to generate a baseband receive signal using the digitally encoded RF RX signal. The method also includes generating, in the baseband digital spectrum translator, a speaker audio signal using the baseband receive signal.

25 Claims, 5 Drawing Sheets

METHODS AND APPARATUS FOR BASEBAND DIGITAL SPECTRUM TRANSLATION (BDST)

BACKGROUND OF THE INVENTION

This invention relates generally to methods and apparatus for wireless digital transmission and/or reception, and more particularly, to methods and apparatus for adapting wireless analog FM transceivers for digital transmission and/or reception.

At least one known digital transceiver has specialized circuitry and software (i.e., circuitry different from that of transceivers that are designed to transmit and receive only analog-FM) built into the transceiver to send and receive digital data. Transceivers having such specialized circuitry are usually more expensive than simple analog FM-only transceivers.

Some known methods for attempting to save the expense of digital communication equipment use an analog FM transmitter for transmitting and/or receiving digital information without requiring any modification to the transceiver. However, a difficulty encountered with this technique is that conventional analog FM transceivers do not pass speech audio frequencies below about 300 Hz. Speech audio frequencies this low are not necessary for maintaining intelligible speech and, furthermore, many transceivers use a low frequency audio band from 67 to 250.3 Hz for tones of a continuous tone coded squelch system (CTCSS). Hereafter, this frequency range from DC to about 300 Hz will be referred to as a "subaudible frequency band," or simply "subaudible frequencies." Baseband filtering in an analog FM transceiver typically rejects the subaudible frequencies from the speech audio that is transmitted and received. This rejection would normally make it very difficult or impossible to use external processing with the analog FM transceiver to produce or demodulate a digitally modulated signal (such as, for example, C4FM, which is a standard used in public safety radio systems), because the filtering removes frequency components near DC that must be retained to ensure quality in transmission such as preserving eye pattern integrity. Also, the speech audio frequencies passed by a typical analog-FM transceiver do not extend beyond about 3000 Hz because higher frequencies are not necessary for intelligible audio communications. This maximum frequency limitation places an upper limitation on the available bandwidth for the digital data. Hereafter, frequencies from about 300 Hz to 3000 Hz will be referred to as the "speech audio frequency band," or simply "speech audio" frequencies. When referring to a transmitter portion of a transceiver or to a separate transmitter, these frequencies may be referred to as the "transmit speech audio frequency band." When referring to a receiver portion of a transceiver or to a separate receiver, these frequencies may be referred to as the "receive speech audio frequency band."

In addition, given the rather loose audio response tolerances in the transmit and receive paths of typical analog FM transceivers, there is likely to be a significant departure from the flat magnitude, linear phase frequency response necessary to preserve the integrity of the digital signal through the transmit/receive path. Also, even though filtering employed in a typical analog FM transceiver may be suitable for handling analog FM signals, such filtering is likely to introduce too much distortion to achieve an acceptable digital eye pattern.

BRIEF DESCRIPTION OF THE INVENTION

In one embodiment, a method for transmitting and receiving digitally modulated wireless signals using an analog FM transceiver is provided. The analog FM transceiver has a transmit speech audio frequency band, a receive speech audio frequency band substantially equal to the transmit speech audio frequency band, a subaudible frequency band, a direct microphone audio input, and a direct speaker audio output. The method includes generating, in a baseband digital spectrum translator external to the analog FM transceiver, a baseband transmit signal occupying frequencies substantially within the transmit speech audio frequency band of the analog FM transceiver. The method also includes applying the generated baseband transmit signal to the direct microphone audio input to thereby transmit a digitally encoded RF TX signal having a constant envelope and using the analog FM transceiver to receive a digitally encoded RF RX signal with a constant envelope and to generate a baseband receive signal using the digitally encoded RF RX signal. The method also includes generating, in the baseband digital spectrum translator, a speaker audio signal using the baseband receive signal.

In another embodiment, a self-contained apparatus for converting an audio signal from a microphone into a baseband transmit signal suitable for transmitting with an analog FM transmitter is provided. The analog FM transmitter has a transmit speech audio frequency band, a subaudible frequency band, and a direct microphone audio input. The apparatus includes an analog to digital converter configured to digitize a received analog audio signal from a microphone. The apparatus further includes a pre-modulation processor configured to generate a baseband transmit signal occupying frequencies substantially within the transmit speech audio frequency band and a digital to analog converter configured to covert the generated baseband transmit signal into an analog audio output that is applied to the direct microphone audio of the FM transmitter to thereby transmit a digitally encoded RF TX signal having a constant envelope.

In yet another embodiment, a self-contained apparatus for decoding baseband receive signals from a direct speaker audio output of an analog FM receiver is provided. The analog FM receiver has a speech audio reception frequency band, a subaudible frequency band, and the direct speaker audio output, The apparatus includes an analog to digital converter configured to convert a baseband receive signal to a digital signal, wherein the baseband receive signal is received from a direct speaker audio output resulting from an FM analog demodulation of a digitally encoded RF RX signal with a constant envelope and occupying frequencies substantially within the receive speech audio frequency band of the FM transceiver. The apparatus further includes a post-demodulation processor configured to generate a speaker audio signal using the converted baseband audio signal, wherein the speaker audio signal substantially replicates an audio signal used to generate the digitally encoded RF RX signal.

In still another embodiment, an apparatus for translating an audio signal from a microphone into a baseband signal is provided that includes an analog to digital converter for digitizing a received analog signal from a microphone. The apparatus further includes a pre-modulation processor for processing the digitized signal, wherein a sideband spectrum of the digitized signal is shifted away from subaudible frequencies by a predetermined amount to generate a digital baseband signal.

DETAILED DESCRIPTION OF THE INVENTION

Figure 1:
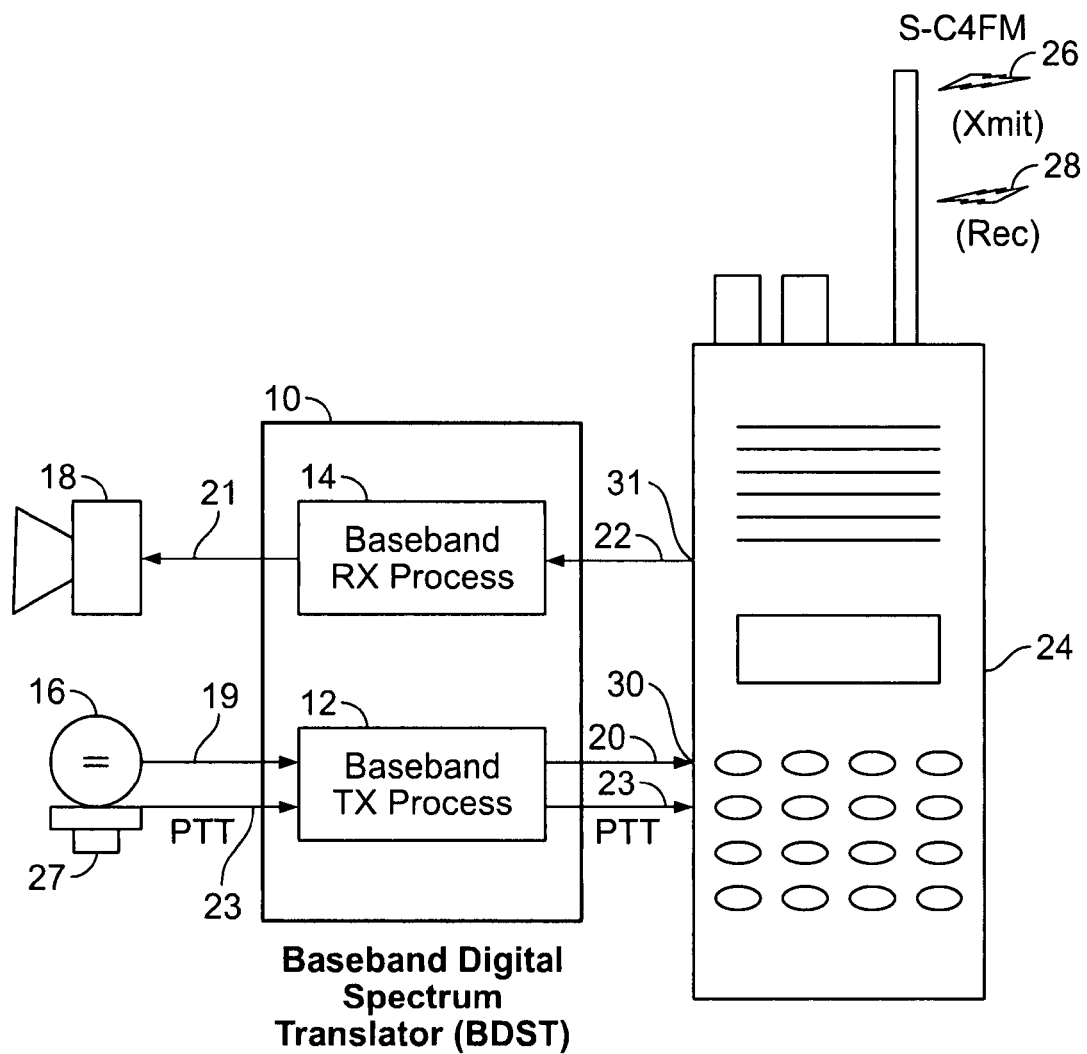
FIG. 1 is a block drawing of a baseband digital spectrum translator (BDST) operatively coupled between a push-to-talk (PTT) speaker-mike and a conventional FM transceiver constructed in accordance with an embodiment of the invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements that do not necessarily have that particular property.

In one embodiment of the present invention and referring to FIG. 1, a self-contained baseband digital spectrum translator (BDST) external adapter 10 for an analog FM transceiver 24 (such as a handheld transceiver) has two baseband processes, namely, a baseband transmit process (baseband TX process) 12 and a baseband receive process (baseband RX process) 14. "Processes" referred to herein may refer either to software or hardware functions. For example, as a software function, baseband TX process 12 may be completely or partially embodied within one or more digital signal processors (DSPs) with instructions for carrying out these processes provided in a memory, as may baseband RX process 14. On the other hand, as a hardware function, baseband TX process 12 may be a function implemented completely or partially by analog hardware, as may baseband RX process 14. Baseband TX process 12 generates a baseband transmit signal (baseband TX signal) 20 from an audio signal from a microphone input 19. Baseband transmit signal 20 is used in place of a direct microphone audio input 30. Baseband RX process 14 generates a speaker audio signal 21 from a baseband receive signal (baseband RX signal) 22 from direct speaker audio output 31.

Baseband TX signal 20 is derived from any constant envelope digital modulation system having a bandwidth of about 2.7 kHz or less, such as C4FM modulation (as defined in the TIA P25 specification). The 2.7 kHz bandwidth is determined by either the transmit speech audio frequency band of analog FM transceiver 24 or the receive speech audio frequency band, both of which are assumed to be 2.7 kHz (starting at about 300 Hz and ending about 3000 Hz) in a typical FM transceiver. The allowable frequency range may thus differ if a different type of analog FM transceiver 24 having wider or narrower frequency ranges is used. Analog FM transceiver 24 produces a digitally encoded RF TX signal 26 and receives a digitally encoded RF RX signal 28 via methods and apparatus described herein.

It should be noted that when reference is made to the baseband TX signal 20 occupying frequencies substantially within the transmit speech audio frequency band of the analog FM transceiver 24, this refers to frequencies generally above the subaudible frequency band to a maximum frequency.

C4FM, a digital modulation system used in public safety communications, has spectral content all the way down to DC, however, baseband TX signal 20 and baseband RX signal 22 at BDST external adapter 10/analog FM transceiver 24 interfaces do not have spectral content from DC to 300 Hz. Instead, the spectrum of a normal baseband C4FM signal is shifted away from DC using a Hilbert transform and mixing process in BDST external adapter 10, so that neither baseband TX signal 20 nor baseband RX signal 22 overlaps the subaudible frequency band that is either unused, or more typically used for continuous tone coded squelch system (CTCSS) tones. Baseband RX process 14 recovers the original C4FM baseband signal by using another Hilbert transform and a mixing operation. The shifted baseband spectrum fits within the upper frequency cutoff of about 3000 Hz used by typical analog FM transceivers. A conventional microphone 16 and a conventional speaker 18 (e.g., miniature speaker) can be used with BDST external adapter 10. Microphone 16 and speaker 18 can be combined into a hand-held or clip-held speaker-mike or headset, and may be provided with a push-to-talk switch (PTT) 27 or a VOX circuit (not shown) that generates a PTT signal 23 when a selected microphone level is reached. Microphone 16, PTT switch 27, and speaker 18 may also be enclosed in the same enclosure as BDST external adapter 10.

Figure 2:
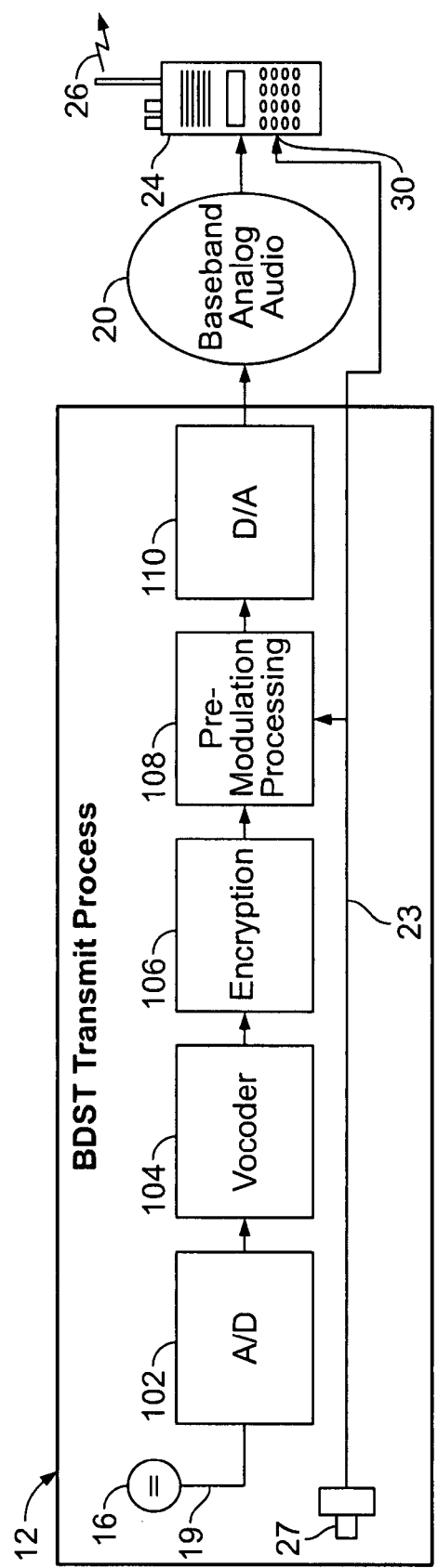
FIG. 2 is a schematic block diagram of the transmit process of the BDST of FIG. 1.

For example, and referring to FIG. 1 and FIG. 2, an analog signal 19 from microphone 16 is processed by transmit process 12 of BDST external adapter 10. The analog signal is converted to a digital signal by A/D converter 102. Additional analog processing (e.g., gain control, limiting, etc.) may optionally be applied prior to this conversion, but is not required to practice the various embodiments of the invention and thus is not shown in FIG. 2. Because configurations of the present invention are especially useful for speech communications, some configurations may provide a voice encoder (vocoder) 104 to reduce the transmitted bandwidth by efficiently encoding the audio speech into a sequence of 1s and 0s, commonly called "bits". Also, in some configurations, an encryption function 106 is provided to further encode the digital input bits into a secure data stream to make it difficult for unauthorized receivers to "eavesdrop" on a secure conversation. Also, the digital bit stream is transformed into a sequence of signals that correspond to allowable symbols in the digital modulation scheme chosen. For example, in the case of C4FM modulation, the bit sequence is mapped into a sequence comprising four symbols, commonly denoted +3, +1, −1, and −3, with each symbol representing two bits of information. A pre-modulation processor 108 produces a smoothed digital output from this sequence and shifts the spectrum of the output so that it does not occupy the sub-audible frequency band. When this digital output is converted to an analog signal by D/A converter 110, the result is a baseband TX signal 20 that, when applied to the microphone input of analog FM transceiver 24, produces the desired digitally encoded RF TX signal 26.

Figure 3:
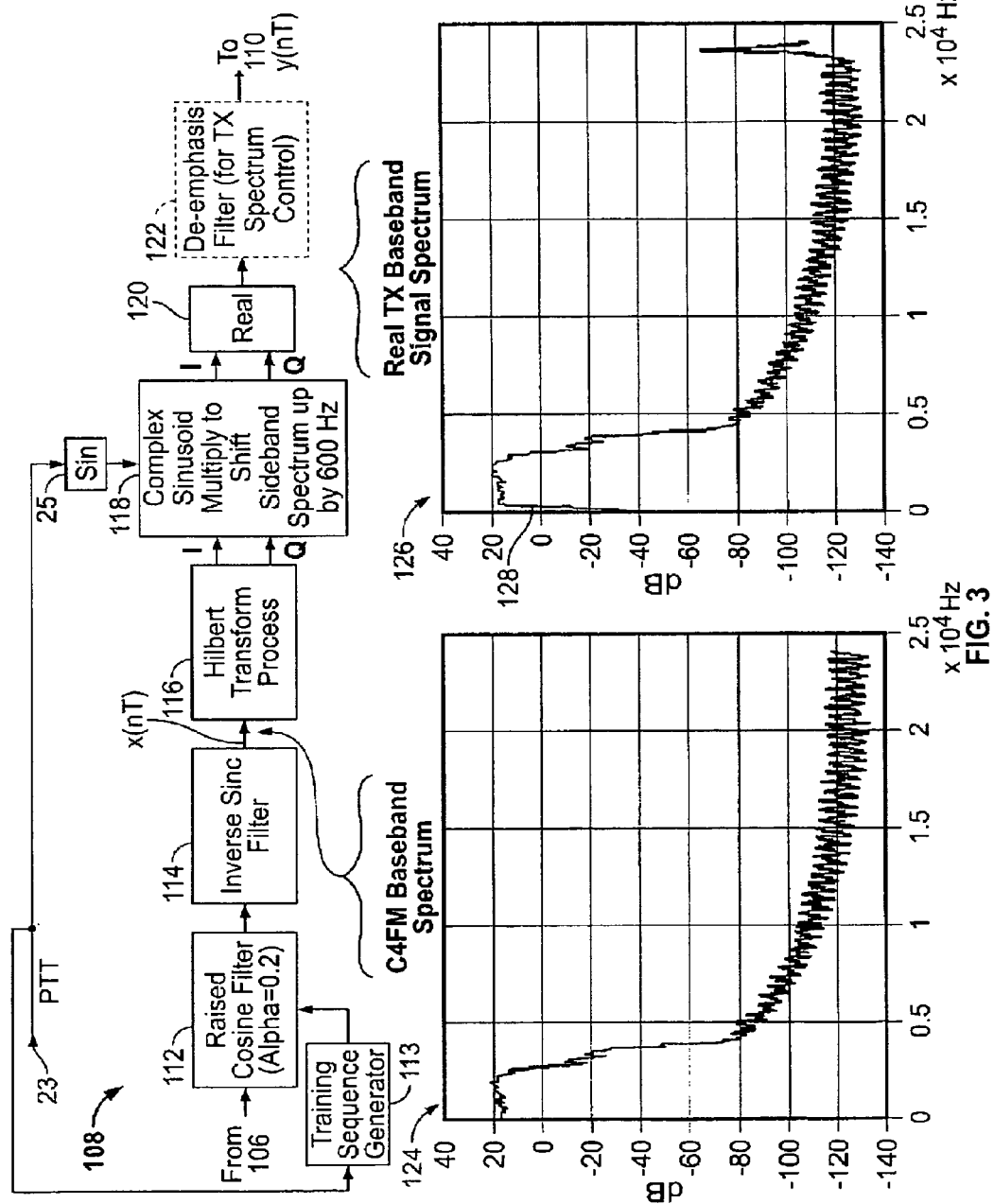
FIG. 3 is a more detailed schematic block diagram of the pre-modulation processing block of FIG. 2.

In some configurations and referring to FIG. 2 and FIG. 3, pre-modulation processor 108 includes filtering (for example, raised cosine filter 112 and inverse sinc filter 114) that produces a suitably encoded and smoothed baseband signal. For example, a C4FM baseband signal is produced by filtering the real signal input from encryption function 106 through a raised cosine filter ($\alpha$=0.2) 112 and an inverse sinc filter 114. At the output of these filters, the modulation is C4FM in accordance with the P25 specification. A typical C4FM baseband spectrum 124 for a voice audio input at microphone 16 is shown in FIG. 3, at the output of inverse sinc filter 114.

Pre-modulation processor 108 can also include a sinusoidal pilot tone generator 25 that generates a pilot tone at the beginning of every push-to-talk (PTT) event. Also, baseband TX process 12 can include a training sequence generator 113 that generates a short (for example, 200 msec) training sequence also at the beginning of some, but not necessarily all, PTT events. Sinusoidal pilot tone generators 25 and training sequence generator 113 can be triggered by the same PTT switch 27 on microphone 16 that is also used to provide PTT switching of analog FM transceiver 24. The pilot tone can be injected by shifter 118 as a digital signal and may be derived from the complex sinusoid used by shifter 118. Baseband RX process 14 can lock to a pilot tone transmitted by another transceiver to facilitate downshifting the baseband spectrum back to its original C4FM form. The training sequence may be used for calibrating an adaptive equalization filter in baseband RX process 14 of BDST external adapter 10 to remove distortion introduced in the analog FM signal path.

In some configurations of the present invention, a Hilbert transform processor 116 creates I and Q complex signals from a real baseband C4FM signal with the negative spectrum removed. Shifter 118, which may be a complex sinusoid multiply function, produces a complex signal with an upper sideband spectrum shifted from that of the real baseband C4FM signal by a predetermined frequency, denoted $f_{subaudible}$, to move the spectrum away from the subaudible frequency band. In at least one configuration, $f_{subaudible}$=600 Hz, enough to avoid the distortion that often occurs in the speech audio band slightly above the 300 Hz cutoff). Baseband TX signal 20, which, in some configurations, is further filtered by de-emphasis filter 122, is generated by real part/downshift function 120, shown as "REAL" in FIG. 3. Real baseband TX signal 20 can be provided to the microphone input of analog FM transceiver 24. That is, if x(nT) is the baseband output of the inverse sinc filter 114 and y(nT) is the baseband output to the microphone input, $$y(nT)=Re\{(x(nT)+j\hat{x}(nT))e^{j2\pi f_{subaudible}nT}\} \quad (1)$$

where $\hat{x}$(nT) is the Hilbert transform of x(nT). The Hilbert transform $\hat{x}$(nT) can be implemented using a DSP in BDST external adapter 10 programmed to implement a finite impulse response (FIR) filter.

The resulting real baseband signal 20 represented by spectrum 126 retains all the original spectral information of the C4FM baseband spectrum 124, but contains a "hole" 128 from about $-f_{subaudible}$ to $+f_{subaudible}$.

FM transceivers 24 usually provide a standard frequency pre-emphasis to the transmitted signal and a compensating frequency de-emphasis to the received signal. To reduce the bandwidth of the transmitted digital signal, an optional de-emphasis filter 122 may be applied to real TX baseband signal 20 out of real function 120 that effectively neutralizes the effect of the transmitting pre-emphasis filter in analog FM transceiver 24.

A shifted C4FM baseband signal represented by spectrum 126 and real TX baseband signal 20 is hereafter referred to as "S-C4FM". An S-C4FM baseband TX signal 20 can be FM modulated in analog FM transceiver 24 even by the simplest constant-envelope direct-FM techniques used by many existing analog FM transceivers.

Figure 4:
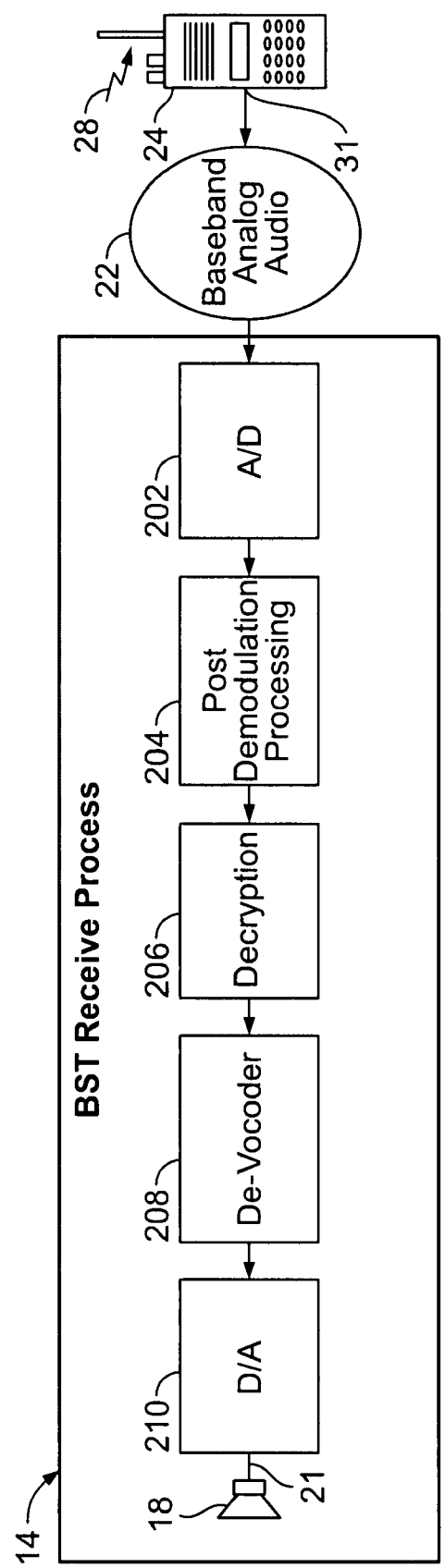
FIG. 4 is a schematic block diagram of the receive process of the BDST of FIG. 1.

Baseband RX process 14, illustrated in FIG. 4, performs the inverse of baseband TX process 12. Referring to FIG. 4, in which the signal processing flows from right to left, a digitally encoded RF RX signal 28 is demodulated by an FM demodulator in analog FM transceiver 24 to produce baseband RX signal 22. This analog signal is digitized by A/D converter 202 of baseband RX processor 14. The digitized signal is operated upon by a post-demodulation processor 204, which, in the illustrated configuration, downshifts the spectrum back to its original C4FM form, extracts the four symbols, +3, +1, −1, −3 and converts them into a bit steam that is sent to the optional decryption function 206 which removes the secure encoding if it was used in the transmitting transceiver. In configurations in which a vocoder is used to generate digital RF RX signal 28, baseband RX process 14 includes a de-vocoder 208, which reverses the vocoding and converts the digital bit stream to a digital audio signal. A D/A converter 210 then generates an analog audio signal 21 suitable for a speaker 18 or headphone. Although not shown in FIG. 4 and not necessary for practicing of the various embodiments of the present invention, additional analog processing or amplification is usually interspersed in the signal path between D/A converter 210 and speaker 18. For example, further amplification and attenuation, and/or shaping of the audio frequency response (e.g., to accentuate bass and/or treble to improve speech intelligibility) can be provided.

Figure 5:
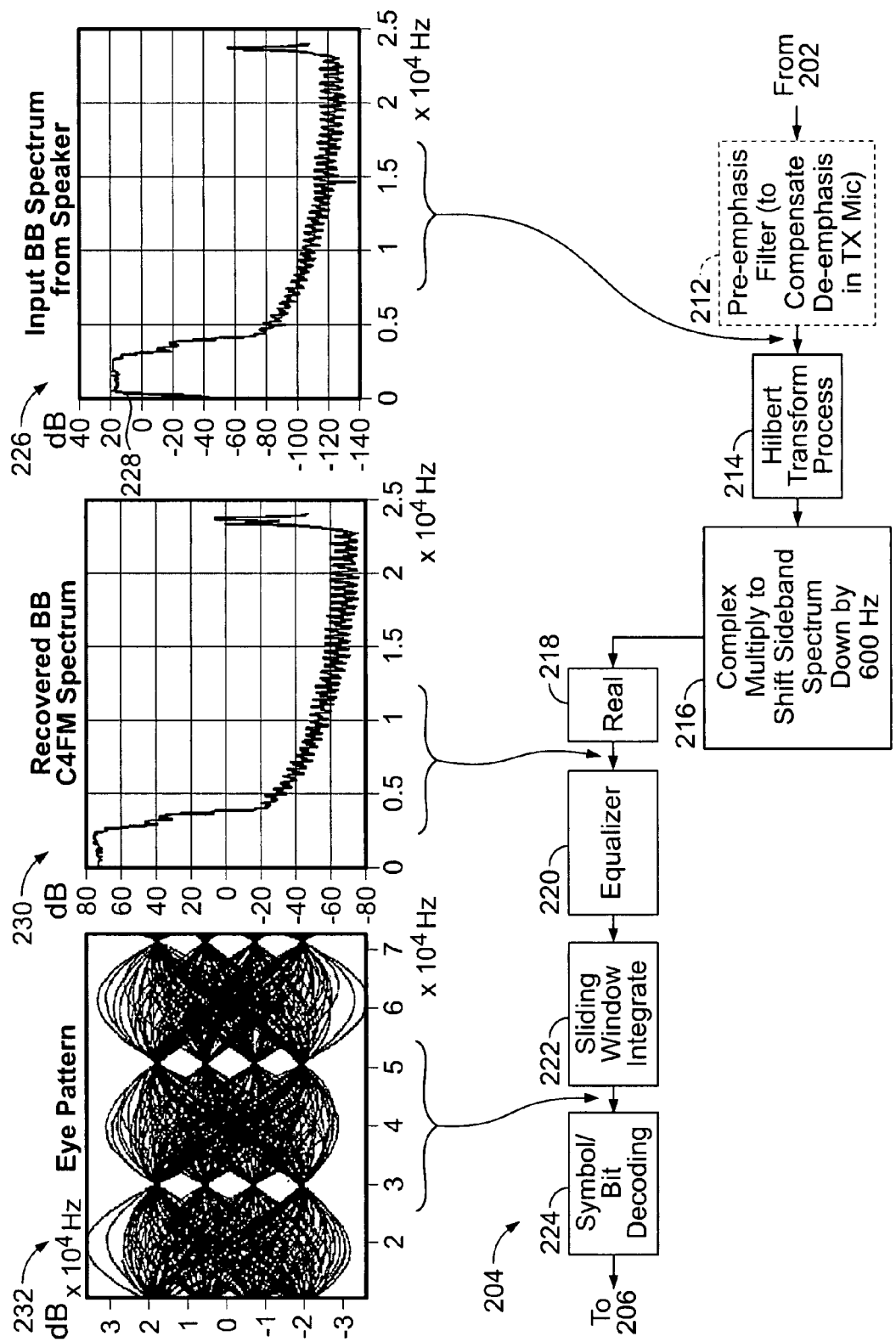
FIG. 5 is a more detailed schematic block diagram of the post demodulation processing block of FIG. 4.

In some configurations and referring to FIG. 5, in which signal flow is from right to left, post demodulation processor 204 comprises a pre-emphasis filter 212 to compensate for a de-emphasis filter usually present in the receiver portion of analog FM transceiver 24. The output of pre-emphasis filter 212 is a baseband signal represented by the associated spectrum 226 in FIG. 5, which in this example configuration is the spectrum of a frequency-shifted S-C4FM baseband signal, but with substantially no energy in the subaudible frequency band from DC to 300 Hz.

To undo the frequency shift of a received S-C4FM baseband signal, a Hilbert transform process 214 creates an I and Q complex signal from the baseband signal 226 (removes the negative frequency sideband), a complex multiply function 216 downshifts this spectrum by $f_{subaudible}$ (e.g., by 600 Hz), and then the I component is removed by real part/downshift function 218 to convert back to a real baseband signal 230 (represented in the drawings as a recovered baseband C4FM spectrum 230) for further processing. More particularly, if y(nT) is the sampled baseband input from the transceiver and z(nT) is the output of this process, $$z(nT)=Re\{(y(nT)+j\hat{y}(nT))e^{-j2\pi f_{subaudible}nT+\theta}\} \quad (2)$$

For the best demodulation of SSB, the complex sinusoid in equation (2) should match the frequency and phase of the complex sinusoid used in baseband TX process 12 in equation (1). A phase-locked-loop (PLL) technique can be employed to lock an oscillator to a sinusoidal pilot tone injected into the baseband signal by the transmitting transceiver as previously described.

Equalizer 220 may be provided in some configurations of the present invention. Equalizer 220 may be a receive adaptive equalizer to ameliorate various forms of distortion (e.g., pre-emphasis filtering, de-emphasis filtering, post-modulation-limiter filtering, etc.) that are introduced into the 300-3000 Hz range by analog FM TX and RX signal paths within analog FM transceiver 24. For example, equalizer 220 may be a linear adaptive filter based on a minimum mean square error (MMSE) criterion that uses a transmitted training sequence to determine tap weights. The number of taps provided for equalizer 220 can vary depending on the severity and characteristics of the distortion to be equalized.

Next, sliding window integrator 222 is provided as a necessary component to achieve the optimum eye pattern for C4FM signals in accordance with P25 specifications; in essence, it "opens the eye". A typical eye pattern 232 of a C4FM signal as output from the sliding window integrator is shown in FIG. 5. A symbol bit decoder 224 is then provided to determine the symbol values (+3, +1, −1, or −3) in the receive signal, and to convert the symbol values to bits to produce a signal that can be decrypted by decryption function 206 (if encryption was applied when transmitted). Decryption function 206 decrypts the symbols of the chosen digital modulation scheme into a bit sequence that can be decoded by de-vocoder 208 and then restored to an audio signal by D/A converter 210 and speaker 18.

It will thus be appreciated that various embodiments of the present invention provide methods and/or apparatus that can use an analog FM transceiver for transmitting and/or receiving digital information without requiring any modification to the transceiver. The various embodiments do not require specialized circuitry and software in the analog FM transceiver for sending and receiving digital data. An external adapter (e.g., BDST external adapter 10) having interfaces to the microphone input (for the transmit signal) and speaker output (for the received signal) is provided for this purpose in some embodiments. Digital data is created using BDST external adapter 10 between the speaker/microphone and the transceiver, and demodulated using the same BDST external adapter 10. BDST external adapter 10 can be made compatible with the typical frequency response for analog FM transceivers, and can provide many of the advantages associated with digital transmission, such as security from eavesdropping. Also, in configurations of the present invention using analog FM transmitters and/or analog FM receivers rather than analog FM transceivers, at least some of the advantages of the present invention may be achieved by BSDT 10 configurations having only a baseband TX process or a baseband RX process, respectively. Moreover, configurations of the present invention permit CTCSS tones to be transmitted and received without interference to or from the digitized baseband signals.

While the invention has been described in terms of various specific embodiments, those skilled in the art will recognize that the various embodiments of the invention can be practiced with modification within the spirit and scope of the claims.

What is claimed is:

1. A method for transmitting and receiving digitally modulated wireless signals using an analog FM transceiver, the analog FM transceiver having a transmit speech audio frequency band, a receive speech audio frequency band substantially equal to the transmit speech audio frequency band, a subaudible frequency band, a direct microphone audio input, and a direct speaker audio output, said method comprising:

generating, in a baseband digital spectrum translator external to the analog FM transceiver, a baseband transmit signal occupying frequencies substantially within the transmit speech audio frequency band of the analog FM transceiver;

applying the generated baseband transmit signal to the direct microphone audio input to thereby transmit a digitally encoded RF TX signal having a constant envelope;

using the analog FM transceiver to receive a digitally encoded RF RX signal with a constant envelope and to generate a baseband receive signal using the digitally encoded RF RX signal; and generating, in the baseband digital spectrum translator, a speaker audio signal using the baseband receive signal.

2. The method of claim 1 wherein said generating a baseband transmit signal further comprises digitizing an analog audio signal to produce a digitized audio signal.

3. The method of claim 2 wherein said generating a baseband transmit signal further comprises vocoding the digitized audio signal.

4. The method of claim 1 wherein said generating a baseband transmit signal further comprises mapping a digitized signal into a sequence of symbols that correspond to a selected constant-envelope digital modulation scheme.

5. The method of claim 1 wherein said generating a baseband transmit signal further comprises upshifting a sideband of a real baseband digital signal by an amount sufficient to place the spectrum of the upshifted sideband within the transmit speech audio frequency band, with substantially no energy within the subaudible frequency band, extracting a real component of the upshifted sideband signal, and converting the extracted component into the real baseband transmit signal for application to the direct microphone audio input.

6. The method of claim 1 wherein said generating, in the baseband digital spectrum translator, a speaker audio signal using the baseband receive signal further comprises digitizing the baseband receive signal and processing the digitized baseband receive signal into a sequence of symbols that correspond to a selected constant-envelope digital modulation scheme.

7. The method of claim 1 wherein said generating, in the baseband digital spectrum translator, a speaker audio signal using the baseband receive signal further comprises downshifting a sideband of the baseband receive signal by an amount dependent upon the subaudible frequency band, extracting a real component of the downshifted sideband signal, and converting the extracted component into a real baseband signal.

8. The method of claim 1 wherein said generating, in the baseband digital spectrum translator, a speaker audio signal using the baseband receive signal further comprises de-vocoding an intermediate signal.

9. The method of claim 1 wherein said generating, in the baseband digital spectrum translator, a speaker audio signal using the baseband receive signal further comprises adaptively equalizing an intermediate signal to reduce distortion resulting from imperfections in a TX-RX radio path, imperfect audio filtering, or both.

10. A self-contained apparatus for converting an audio signal from a microphone into a baseband transmit signal suitable for transmitting with an analog FM transmitter, the analog FM transmitter having a transmit speech audio frequency band, a subaudible frequency band, and a direct microphone audio input, said apparatus comprising:

an analog to digital converter configured to digitize a received analog audio signal from a microphone;

a pre-modulation processor configured to generate a baseband transmit signal occupying frequencies substantially within the transmit speech audio frequency band; and a digital to analog converter configured to convert the generated baseband transmit signal into an analog audio output that is applied to the direct microphone audio of the FM transmitter to thereby transmit a digitally encoded RF TX signal having a constant envelope.

11. The apparatus of claim 10 further comprising a vocoder configured to encode the digitized audio signal.

12. The apparatus of claim 10 further configured to map the digitized signals into a sequence of symbols that correspond to a selected constant-envelope digital modulation scheme.

13. The apparatus of claim 10 wherein the pre-modulation processor is further configured to upshift a sideband of a real baseband digital signal by an amount exceeding the subaudible frequency band, and to extract a real component of the upshifted sideband signal to convert the extracted component into a baseband TX signal for application to the direct microphone input of the analog FM transmitter.

14. A self-contained apparatus for decoding baseband receive signals from a direct speaker audio output of an analog FM transceiver, the analog FM transceiver having a speech audio reception frequency band, a subaudible frequency band, and the direct speaker audio output, said apparatus comprising:

an analog to digital converter configured to convert a baseband receive signal to a digital signal, the baseband receive signal received from a direct speaker audio output resulting from an FM analog demodulation of a digitally encoded RF RX signal with a constant envelope and occupying frequencies substantially within the receive speech audio frequency band of the FM transceiver; and a post-demodulation processor configured to generate a speaker audio signal using the converted baseband audio signal, wherein the speaker audio signal substantially replicates an audio signal used to generate the digitally encoded RF RX signal.

15. The apparatus of claim 14 further wherein the postdemodulation processor is further configured to downshift a sideband of the direct speaker audio output by an amount dependent upon the subaudible frequency band, and to extract a real component of the downshifted sideband signal to convert the extracted component into a real baseband signal.

16. The apparatus of claim 14 further configured to adaptively equalize an intermediate signal to reduce distortion resulting from imperfections in a TX-RX radio path, imperfect audio filtering, or both.

17. The apparatus of claim 14 wherein FM transceiver comprises an FM transmitter, the FM transmitter having a transmit speech audio frequency band, a subaudible frequency band, and a direct microphone audio input, and said apparatus further configured to:

digitize an audio signal from a microphone;

generate, from the digitized audio signal, a baseband transmit signal having a constant envelope and substantially contained within the transmit speech audio frequency band of the analog FM transceiver; and apply the generated baseband transmit signal into the direct microphone audio input to thereby transmit a digitally encoded RF TX signal having a constant envelope.

18. The apparatus of claim 17 further comprising a vocoder configured to encode the digitized audio signal, and a devocoder, and to generate a speaker audio signal using the converted baseband audio signal, said apparatus is configured to devocode an intermediate digital signal.

19. The apparatus of claim 17 further configured to upshift a sideband of a real baseband digital signal by an amount sufficient to avoid the subaudible frequency band, to extract a real component of the upshifted sideband signal, and to convert the extracted component into a real baseband signal for application to the direct microphone audio input; and also further configured to downshift a sideband of the direct speaker audio output by an amount dependent upon the subaudible frequency band, and extract a real component of the downshifted sideband signal to convert the extracted component into a real baseband analog receive signal.

20. The apparatus of claim 17 configured to connect externally to the FM transceiver, and between the FM transceiver and a speaker-microphone.

21. An apparatus for translating an audio signal from a microphone into a baseband signal, said apparatus comprising: an analog to digital converter for digitizing a received analog signal; a pre-modulation processor for processing the digitized signal, wherein a sideband spectrum of the digitized signal is shifted away from sub-audible frequencies by a predetermined amount of at least of 300 Hz, and to generate a digital baseband signal.

22. The apparatus of claim 21 wherein the pre-modulation processor is configured to generate a digitally encoded transmit signal having a constant envelope.

23. The apparatus of claim 21 further comprising a speaker and a post-demodulation processor configured to process digitized signals from the speaker, wherein a sideband of the direct speaker audio output is downshifted by an amount dependent upon the subaudible frequencies.

24. The apparatus of claim 21 further comprising a training sequence generator for generating a training sequence.

25. The apparatus of claim 21 wherein the pre-modulation processor comprises a sinusoidal pilot tone generator for generating a pilot tone.

* * * * *